Dec. 30, 1930.   J. F. SEITZ   1,787,023
CAMERA AND METHOD OF PHOTOGRAPHY
Filed Nov. 22, 1926   3 Sheets-Sheet 1

Inventor:
John F. Seitz
by Hazard and Miller
Attorneys.

Dec. 30, 1930.   J. F. SEITZ   1,787,023
CAMERA AND METHOD OF PHOTOGRAPHY
Filed Nov. 22, 1926   3 Sheets-Sheet 2
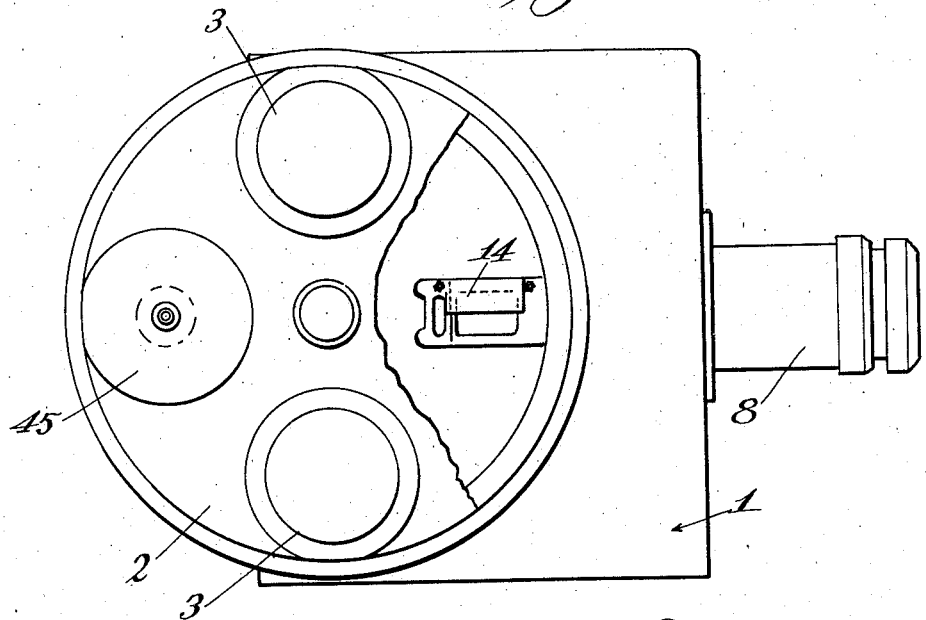
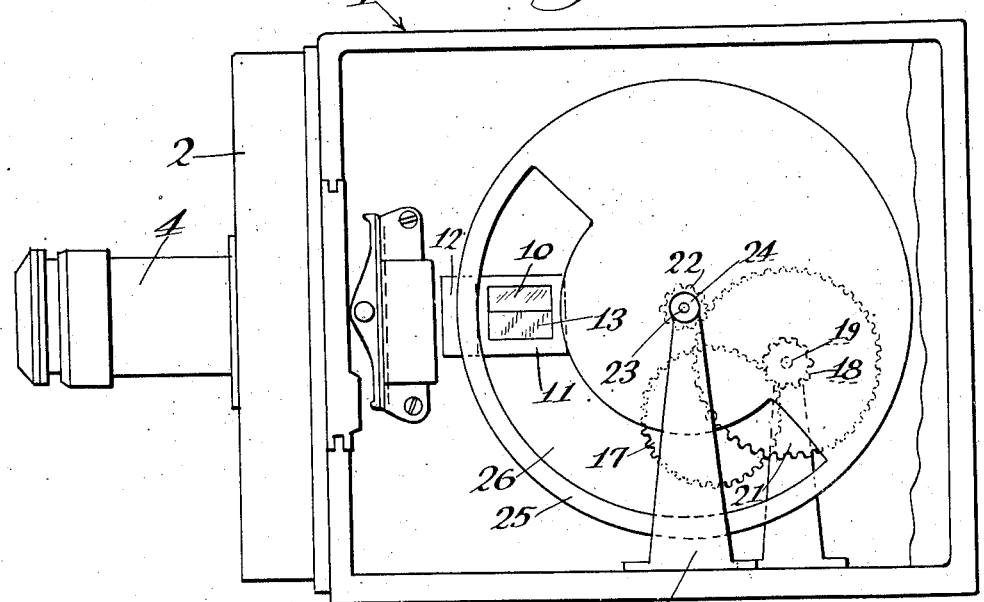

Dec. 30, 1930.  J. F. SEITZ  1,787,023
CAMERA AND METHOD OF PHOTOGRAPHY
Filed Nov. 22, 1926   3 Sheets-Sheet 3

Inventor
John F. Seitz
by Hazard and Miller
Attorneys.

Patented Dec. 30, 1930

1,787,023

UNITED STATES PATENT OFFICE

JOHN F. SEITZ, OF HOLLYWOOD, CALIFORNIA

CAMERA AND METHOD OF PHOTOGRAPHY

Application filed November 22, 1926. Serial No. 149,937.

My invention pertains to cameras, particularly motion picture cameras, and in the method of photography, particularly the photography of moving pictures.

An object of my invention is the construction of a camera whereby photographs may be taken through different lenses on the same film or plate at the same time in which, if desired, the different pictures may be superimposed one on the other, or may be matted separately and in a manner complementary to each other, so that when brought together on the same film they will make a composite picture.

A more specific object of my invention is the construction of a camera with two lenses located at substantially right angles to each other, one lens being used to photograph directly on the film or plate, the other lens photographing by means of a prism. The film may be sensitized on both sides so that the pictures could be taken on opposite sides of the same, but generally only one side will be, or need be, sensitized. The light from one lens affects the sensitive emulsion directly, the light from the other lens reflecting through the prism affects the emulsion through the celluloid side.

A further object of my invention is the construction of a camera with lenses at substantially right angles to each other, one lens having the film directly behind it, the other lens reflecting light on the film through a prism, these lenses being so arranged as to be easily removable in turn. Two special projecting lamps, one for each lens, are so mounted on the camera that they can be conveniently swung into position and substituted for the lenses. This is an important feature of the camera whereby parts of the separate scenes can be matted in a manner complementary to each other so that when brought together on the same film they will make a composite picture.

A further object of my invention is in the method of making mats for motion pictures, and in one procedure, simultaneous photographs may be taken through both of the lenses on the front and back of the same frames of the film and showing complete pictures of the harmonious and inharmonious parts of the scene. After this picture is developed, one of the lenses may be shifted and a projecting lamp substituted therefor. The developed picture is then projected on a screen which may be utilized to form the mat and the marking for outlining the mat may be made to correctly photograph parts which will harmonize when the mats are set up in proper relation to the lenses. The developed picture may be projected through either lens.

In another procedure separate pictures through each lens, on strips of film, may be taken, then after development, these may be projected on screens by transposing the lamps in place of the lenses and marking the screen to delineate the shape of the mat.

Many uses could be made of a camera so equipped.

One use of this camera and method of photography is in taking a photograph of a relatively inaccessible or dangerous scene, such as a natural scene in which the actors would have great difficulty in acting in the natural location. By this method, one lens is focused on a natural scene, for example; a waterfall, sixty feet in height, and the other lens is focused on the actors on a tight rope about three feet from the ground. The undesired portions of these scenes are matted off, the mats complementing each other and the composite thus formed shows the actors walking across the sixty foot water-fall.

Another use of this camera and method would be in utilizing a small photograph, painting or model, for the greater portion of a set or location for a motion picture, building a smaller portion of the set or location in full size to accommodate the action, one lens is focused on the action, the other on the small photograph, painting or model, both scenes are matted as desired, and brought together on the same film and same frame to form the desired composite picture.

In order to obtain the proper mats and shape of the set, a photograph, painting, or model may be used; a photograph may be taken of the small photograph, painting or model and of the full size part of the location, these being taken through the different lenses, the films developed and then by transposing the projecting lamps for the lenses, the developed pictures may be projected on the screen in order to obtain the outline for the proper complementary mats.

A further use of this camera and method would be in the superimposing of titles on backgrounds of any kind, painted, modeled or real; one lens photographing the title, the other the background.

A still further use of the camera and method would be in bringing together different scenes without matting, useful in depicting scenes of chaos, confusion, for dreams and weird effects of all kinds.

A still further use of this camera and method would be to place one or even two developed films, having a desired picture or design, in the camera in contact with a sensitive film and using the light received by one or both of the lenses to print on this sensitive film.

Another use of this camera and method would be to place one or two developed films in the camera, each one having a certain design or picture and also a clear space, in contact with a sensitive film and with the light received by one or both lenses effect a photographic exposure and print the impression of the developed films on the sensitive film simultaneously.

My invention in its various characteristics will be more readily understood from the following description and drawings, in which:

Figure 2 is a front elevation taken in the direction of the arrow 2 of Fig. 1, partly broken away.

Figure 3 is an interior side elevation taken in the direction of the arrow 3 of Fig. 1, with the side gate and the side lens removed.

Figure 1:
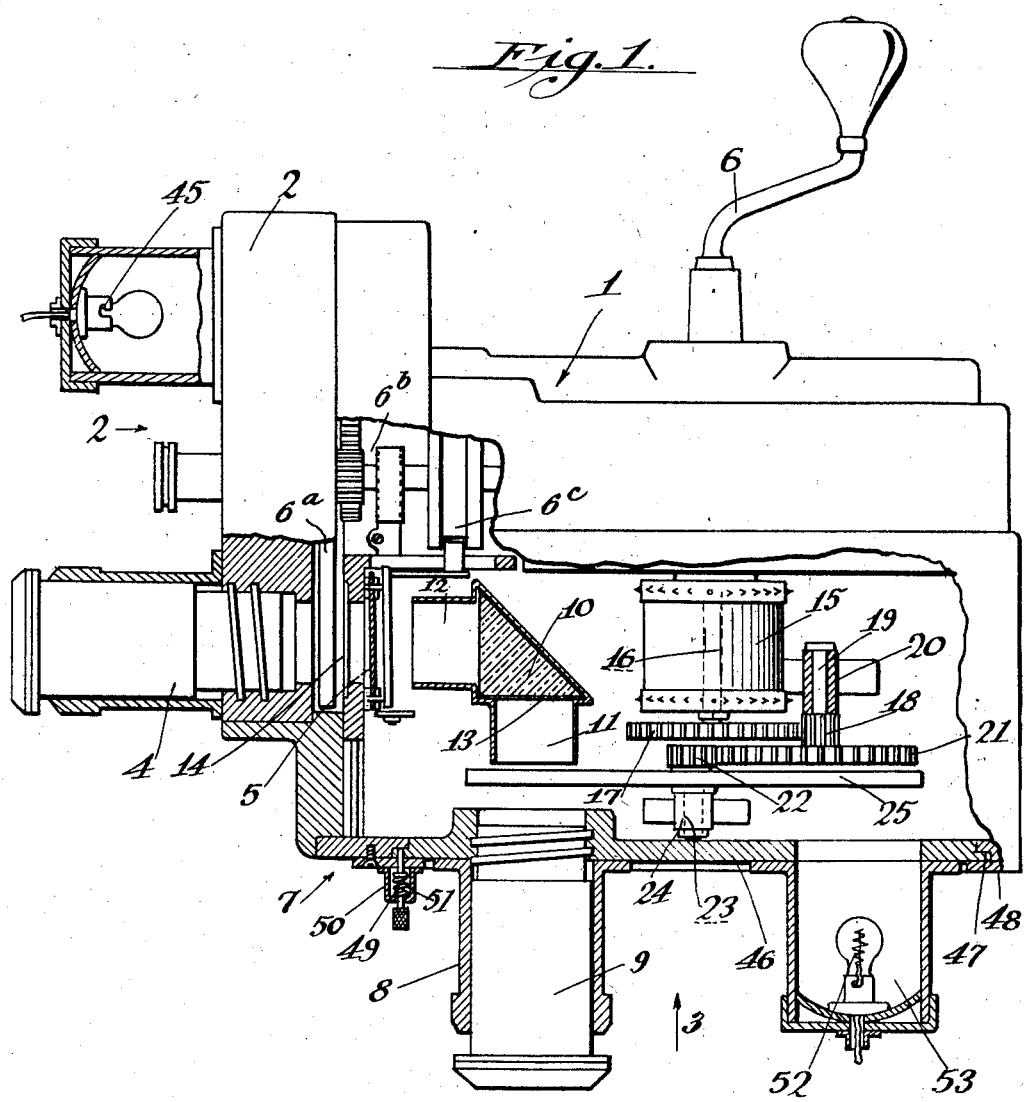
Figure 1 is a plan view, partly in section, of a moving picture camera construction in accordance with my invention.

Referring particularly to the camera construction of Figs. 1, 2 and 3, the ordinary moving picture camera is designated by the numeral 1, having a turret 2 on the front with a series of lenses 3, a particular one of the lenses designated by the numeral 4 being shown in operative position in front of the film 5. The film is operated by the usual moving picture camera mechanism, this being actuated by a crank 6. It is not necessary to describe the construction or operation of the film moving mechanism in detail as this is of a standard character, nor is it necessary to describe the type of shutter used with the lens 4 as this is also of the ordinary construction. The front lens may be focused in the ordinary manner and if desired may be utilized to take a picture independently of the side or auxiliary lens.

A shutter 6$^a$ is mounted in the camera between the lens 4 and the film 5 and is driven by mechanism 6$^b$. The film is shifted by standard mechanism 6$^c$. The shutter, the mechanism for operating the same, and the means for shifting the film are those now used in the art and form no part of my invention so far as one side of the camera is concerned, as I use standard and known equipment which it is not necessary to detail in full.

The construction for taking the side or auxiliary pictures is substantially as follows, having reference to Figs. 1, 2 and 3:

A gate 7 forms one side of the camera or is secured to such side and it is preferably hinged so that same may be opened. This gate carries a suitable lens holder 8 in which a lens assembly 9 may be secured. The holder may be of any standard type and the lenses also of the standard type to fit the holder. A prism 10 is mounted in the camera by any suitable supporting structure, there being light passages 11 and 12 leading from the lens assembly 9 to the prism and from the prism to the film 5. A holder for a mat 13 is positioned adjacent the prism so that a suitable mat may be inserted to block off part of the picture projected through the lens assembly 9. A suitable holder for a mat 14 is also located behind the main lens assembly 4 so that part of the picture taken through such lens may be blocked off.

The main sprocket 15 of the moving picture camera has the usual shaft 16 and on the end of this shaft a gear 17 is mounted. This drives a pinion 18, mounted on the pinion shaft 19, journaled in a suitable bracket 20, this bracket being suitably supported in the camera. A driven gear 21 is connected to the pinion shaft to operate with the pinion and drives a shutter operating gear 22, this being mounted on a shaft 23, which is journaled in a suitable journal box 24, this journal box being likewise suitably supported by the structure of the camera. A shutter 25 is connected to the shaft 23 and gives the exposure by taking pictures through the lens assembly 9. In Fig. 3 the open part of the shutter is designated by the numeral 26, exposing the light passage 11 and the mat 13 positioned to cut off the lower part of the picture taken through such lens assembly.

The shutter 6$^a$ associated with the lens 4 is, as above mentioned, operated in a standard manner which forms no immediate part of my invention and the film is also, as above mentioned, shifted in a standard and known manner, and hence need not be described in detail, this movement of the shutter and film being developed through turning the crank 6.

The manner of operating my camera is substantially as follows:

If mats are to be used in the camera adjacent the film, as above described, these will be arranged so that the proper part of the picture taken through the lens assemblies 4 and 9 will be blocked off. In Fig. 2 it will be seen that the mat 14 cuts off the upper part of the picture taken through lens 4 and in Fig. 3 that the mat 13 cuts off the lower part of the picture taken through the lens assembly 9. The film, as above described, may be sensitized on both sides or on only the one side as is the common practice. The film operates in the normal manner and both of the shutters work in synchronism in order to expose both of the lenses at the same time so that a simultaneous picture is taken through both of the lens assemblies on the frame of the film immediately behind the lens assembly 4.

Figure 4:
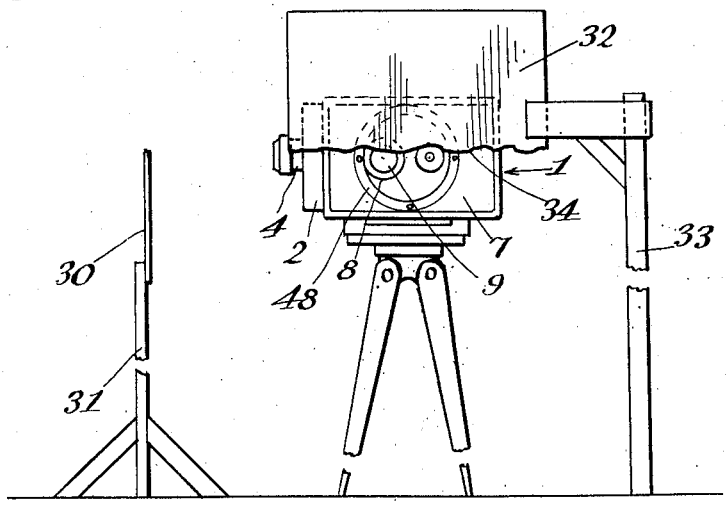
Figure 4 is a side elevation of my camera set up with mats placed exterior thereto, there being a mat in front of the lower part of the front lens and a mat in front of the upper part of the side lens, such mats cutting off parts of the pictures taken through each of the lenses.

In Fig. 4 I illustrate a set up for my camera in which the front of the camera having the lens assembly 4 has a mat 30 positioned on a suitable support 31 in front of the lens. This mat is shown as substantially covering the lower part of the lens so that a photograph may be taken through the upper part of the lens 4. The side or auxiliary lens 9 has a mat 32 positioned in front of same, this mat being held in a suitable supporting structure 33 and covers the upper part of the lens so that a picture may be taken through the lower part. These mats may have irregular contours as indicated by the numeral 34 and may be made in any suitable manner. It is intended that the mats be especially shaped in their contour or outline in order to block out the desired parts of the total scene or act viewable through each of the lenses and by having the mats on the supporting structure outside of the camera, these may be positioned with sufficient accuracy so that the two pictures when taken on the one film will harmonize and give the effect as if photographed at one and the same time.

Figure 5:
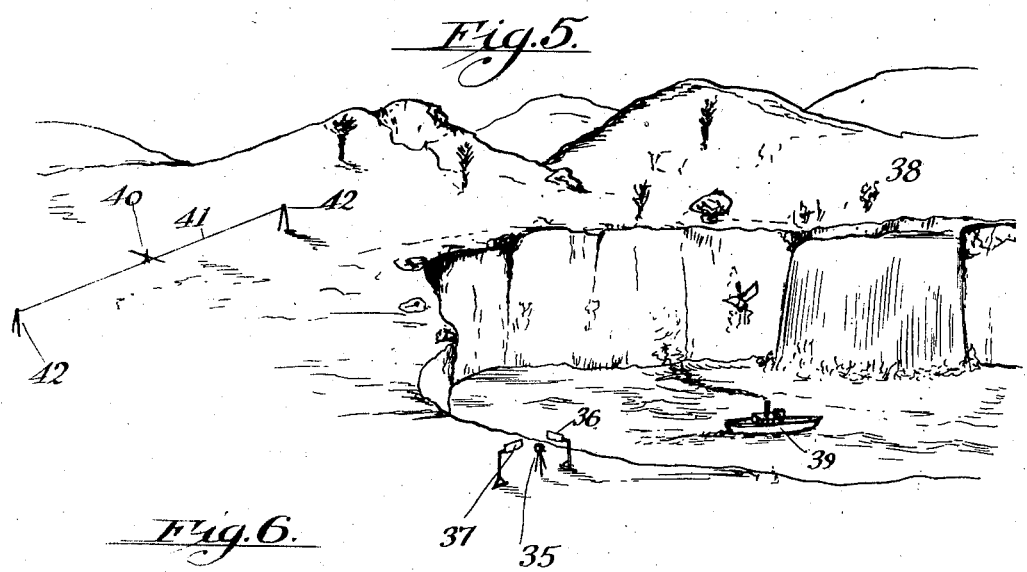
Figure 5 is a perspective view illustrating a use of my camera, one lens photographing the water-fall and the vessel in front of the falls and the other lens photographing the actor on the tight rope.
Figure 6:
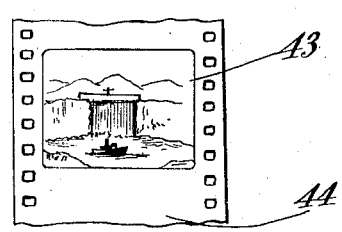
Figure 6 is a frame of a film illustrating the type picture of the scene of Fig. 5.

In Fig. 5 I indicate a use of my camera in which the camera is indicated generally by the numeral 35 and the mats by the numerals 36 and 37. The natural scenery has a water fall 38 with a vessel 39 in front of such fall and it is desired to photograph the water fall and at the same time a tight rope walker 40. This tight rope walker may walk on a rope 41 stretched between towers 42, these being located in a safe position where should he fall but little injury would be had and in a convenient place for taking a photograph.

The mat 36 would be specially cut or of such contour as to mat or block out the part of the natural scenery above the water fall and the mat 37 would be designed to mat out the part of the natural landscape below the tight rope and the tight rope walker, therefore a photograph taken through the two lenses of my camera will give a picture depicting both scenes. This is indicated on a frame 43 of the film 44 in which the tight rope walker appears to be walking across a rope stretched across the water fall.

It will thus be seen that with my camera and my method of taking pictures it is fairly simple matter to depict acts as if performed in very dangerous positions or positions difficult of access and that the actors may be in locations where they can easily perform and in comparative safety. It is to be understood, however, that my camera and the method of taking pictures is not limited to those of this character as many other uses will be suggested to those familiar with the art of motion picture photography.

It will be obvious that the details of the camera may be changed, there being no absolute necessity that the lenses be located at right angles to each other or that they have the particular mounting illustrated in the drawings. The method of operation also may be altered in accordance with the type of picture being photographed.

In order to have a ready means of transposing the lenses and placing projecting lights to shine through the film, on the front of the camera on the turret 2 I preferably remove one of the lenses and insert a lamp 45, which may be connected to an electric circuit in any suitable manner. Thus if it is desired to project a picture through the side lens 8, it is only necessary to rotate the turret 2, shifting the lens 4 so that the light from the lamp will shine through the film, be reflected in the prism, and projected on a screen or the like through the lens 9, or a projecting lens substituted in its place.

The gate 7 at the side of the camera is also preferably arranged so that a light can be transposed for the lens 9 at the side of the prism. To affect this, I preferably construct a turntable disc 46 in the gate, there being interfitting flanges 47 with a flat ring 48 fitting over the disc, the ring being secured preferably to the gate. A slide pin 49, sliding in a housing 50 and pressed by a spring 51, is used to locate the disc in the desired position in reference to the prism. The lamp 52 is mounted in a suitable lamp holder 53 and may be connected in any suitable manner to a source of electric power. Therefore, by turning the disc in the gate 7, the lens may be shifted from its position adjacent the prism and the lamp substituted, whence light may be reflected by the prism and projected through the film and the lens 4, or another lens substituted for same.

By this construction the camera may be utilized for forming mats or the like by shifting the lenses out of position and projecting the light through a picture on a suitable screen. This construction facilitates the use of the camera and if it is inconvenient to take the photographs simultaneously through the two lenses, a photograph may be taken through one lens, using a suitable mat if desired, and then, after rewinding the film, take a photograph through the other lens, using a suitable mat if such be desired.

Various other ways of using my combined camera and projecting arrangement will appear from the above description.

It is to be understood that my camera may be used in various ways other than those described above. For instance, sometimes it is inconvenient to take the pictures through both the main and the auxiliary lens at the same time and in such cases a picture may be taken through one lens, using a suitable mat, the film may then be rewound, and the second picture taken through the second lens, using a suitable mat, so that the two pictures will appear on each of the frames of the film.

In order to form accurate mats in taking complementary pictures which are to be united on the same frames of the same film to give a complete effect, it is desirable that the camera be left in position after taking a short strip of each of the complementary parts of the picture, and during the development of these strips. In the projection of the pictures formed from these trial strips, if done out of doors, a tent may be placed over the camera so that the screens on which the projection is made is in the dark, or by using sufficiently powerful lamps the projected trial pictures may be sufficiently bright for the purpose of forming accurate mats. When the camera is used in studio work in taking pictures, after taking the trial pictures and projecting these on suitable screens the studio may be darkened. It will, therefore, be seen that by the ready means which I have developed for first taking pictures in two different directions on the same frame of the same film and, after development of such trial pictures, projecting these on two screens, that I have effected a procedure which enables mats to be made with great accuracy, hence simplifying the procedure in taking complementary pictures to form a composite motion picture.

A suitable enclosure and screen for projecting the developed trial pictures for making the mat is disclosed in my Patent No. 1,576,854, Method of making motion picture film, patented March 16, 1926, and Patent No. 1,616,237, Method of making motion pictures, patented February 1, 1927.

Various changes may be made in the principles of my invention without departing from the spirit thereof, as set forth in the description, drawings and claims.

I claim:

1. A combination camera and projector comprising a camera structure having a main lens, a film holder to receive light directly through the lens on the film, an auxiliary lens in the side of the camera, means to reflect light passing through the auxiliary lens on the back of the film, and a lamp holder secured in the side of the camera and shiftable to replace the auxiliary lens in relation to the reflector whereby light may be projected from the holder and reflected through the film and through the main lens.

2. A combination camera and projector comprising a camera having a shiftable turret with a main lens and a first lamp holder mounted therein, a film holder directly behind the lens, the first lamp holder being shiftable into the position of the lens, a side wall for the camera having a rotatable structure thereon, said structure having an auxiliary lens and a second lamp holder, a reflector to receive light through the auxiliary lens and reflect same onto a film in the film holder, the turret and rotary structure being shiftable independently whereby light may be projected through either the main or the auxiliary lens.

3. A combination camera and projector comprising a camera structure having a pair of lenses positioned at an angle to each other, means to hold a film to receive light directly from one of the lenses on one side, a reflecting means to reflect light from the other lens on the opposite side of the film and on the same frame thereof, simultaneously operating shutters for each of the lenses, means to shift the film, each of the lenses being mounted on a turret-like structure, projecting lamps mounted on each turret-like structure, and means to shift said turret-like structures to replace either of the lenses by a lamp structure to project light from the lamp through the lens retained in the camera and projector.

4. The method of making mats comprising making trial photographs on strips of film through a plurality of lenses positioned at an angle to each other in a camera-like structure, developing such strips of film and replacing same in the same camera-like structure, and projecting light in the same path traversed by light through one of the lenses in taking the photographs, said light passing through the developed film and following the path of the other lens and utilizing the projected picture in the formation of a mat.

5. The method of making mats comprising taking photographs on strips of film in a camera-like structure through a pair of lenses positioned at an angle to each other, developing said strips of film, replacing one of the lenses by a projecting lamp and projecting the light from such lamp through the developed film and through the other lens retained in the camera-like structure and utilizing the projected picture in the formation of a mat.

6. The method of making mats comprising taking photographs on opposite sides of a film in a camera-like structure, one of said photographs being taken through an opening facing the film, the other being taken through another opening and by reflection on the opposite side of the film, developing the film and replacing in the same camera-like structure, then positioning a projecting lamp at one of the openings and projecting a light from the lamp through one of the openings through the developed photograph and through the other opening and utilizing the projected picture in the formation of a mat.

7. The method of making mats comprising taking a plurality of photographs of different objects on a film in a camera-like structure through openings at an angle to each other, developing the photographs and replacing the developed film in the camera-like structure, then projecting a light through a first opening and through the film and through the second opening, and subsequently projecting another light through the second opening, through the developed film and through the first opening and utilizing the projected picture in the formation of a mat.

8. In a method of making mats, exposing a film to two component parts of a picture simultaneously, one part photographing on one face and the other on the other face of the emulsion or film, developing the film, projecting a picture of the developed film on a screen and utilizing such projected picture in making a mat.

9. In a method of making mats, exposing a film in a camera to two component parts of a picture, one part photographing on one face and the other on the other face of the emulsion or film, developing the film and replacing in the camera, the camera being in the same position as when making the exposures and projecting a picture by a projector light passing through the film in either direction, and utilizing the picture projected on the screen in making a mat.

10. In a method of making mats, exposing a film in a camera to two component parts of a picture simultaneously, one part photographing by direct light on one face and the other by reflected light on the other face of the emulsion or film, developing the film and replacing in the camera, then projecting a picture of the developed film on a screen and utilizing the projected picture in making a mat.

11. A combination camera and projector, comprising a camera structure having a main lens, a film holder to receive light directly through the lens on the film, a shiftable structure mounted on one side of the camera and having an auxiliary lens, a reflecting means in the camera to reflect light from the auxiliary lens on to the film, a lamp holder on the shiftable structure adapted to replace the auxiliary lens, whereby light may be projected from the lamp by the reflector through the film and main lens.

12. A combination camera and projector comprising a camera structure having a shiftable device on the front thereof, said device having a main lens and a lamp holder, a film holder to receive light directly through the main lens, a reflector, an auxiliary lens projecting light on the film by the reflector, the shiftable structure being adapted to replace the lamp holder for the main lens, whereby light may be projected from the lamp holder through the film and by means of the reflector through the auxiliary lens.

In testimony whereof I have signed my name to this specification.

JOHN F. SEITZ.